United States Patent
Yang et al.

(10) Patent No.: US 10,559,004 B2
(45) Date of Patent: Feb. 11, 2020

(54) SYSTEMS AND METHODS FOR ESTABLISHING AND UTILIZING A HIERARCHICAL BAYESIAN FRAMEWORK FOR AD CLICK THROUGH RATE PREDICTION

(71) Applicant: Oath Inc., New York, NY (US)

(72) Inventors: Hongxia Yang, San Jose, CA (US); Robert Ormandi, Redwood City, CA (US); Han-Yun Tsao, Sunnyvale, CA (US); Quan Lu, San Diego, CA (US)

(73) Assignee: Oath Inc., New York, NY (US)

( * ) Notice: Subject to any disclaimer, the term of this patent is extended or adjusted under 35 U.S.C. 154(b) by 622 days.

(21) Appl. No.: 14/874,153

(22) Filed: Oct. 2, 2015

(65) Prior Publication Data

US 2017/0098240 A1    Apr. 6, 2017

(51) Int. Cl.
*G06Q 30/02* (2012.01)
*G06N 7/00* (2006.01)

(52) U.S. Cl.
CPC ......... *G06Q 30/0254* (2013.01); *G06N 7/005* (2013.01)

(58) Field of Classification Search
USPC ...................................................... 705/14.49
See application file for complete search history.

(56) References Cited

U.S. PATENT DOCUMENTS

| | | |
|---|---|---|
| 2010/0082421 A1 | 4/2010 | Tuladhar et al. |
| 2010/0306161 A1 | 12/2010 | Chen et al. |
| 2013/0325590 A1 | 12/2013 | Shekhawat et al. |

FOREIGN PATENT DOCUMENTS

WO    2014/036017 A1    3/2014

OTHER PUBLICATIONS

A. Agarwal and J.C. Duchi. Distributed delayed stochastic optimization. In *2012 IEEE 51st Annual Conference*, 2012.

Eugene Agichtein, Eric Brill, and Susan Dumais, Improving web search ranking by incorporating user behavior information. In *Proceedings of the 29th Annual International ACM SIGIR Conference on Research and Development in Information Retrieval*, SIGIR '06, pp. 19-26, New York, NY, USA, 2006. ACM.

(Continued)

*Primary Examiner* — Saba Dagnew
(74) *Attorney, Agent, or Firm* — Cooper Legal Group, LLC

(57) ABSTRACT

The present disclosure relates to a computer system configured establish and utilize a database for online ad realization prediction in an ad display platform associated with N parties, wherein N is a positive integral greater than 1. The computer system is configured obtain a party hierarchy for each of the N parties including a plurality of features of the party; select a target ad display event including N features, each of the N features corresponding to a node in a party hierarchy; obtain a prior probability reflecting an unconditional probability of ad realization occurrence at the target ad display event among all possible ad display events; for each of the N features: determine a marginal prior probability by decomposing components associated with the other N−1 features from the prior probability; determine a marginal posterior probability based on the marginal prior probability; and save the marginal posterior probability in the corresponding node of the party hierarchy.

20 Claims, 5 Drawing Sheets

(56) References Cited

OTHER PUBLICATIONS

Ye Chen, Bo Anderson, and et al. Real-time bidding algorithms for performance-based display ad allocation. In *ACM SIGKDD Conf. on Knowledge Discovery and Data Mining*, 2011.
Haibin Cheng and Erick Cantu-Paz. Personalized click prediction in sponsored search. In *Proceedings of the Third ACM International Conference on Web Search and Data Mining*, WSDM '10, pp. 351-359, New York, NY, USA, 2010. ACM.
Haibin Cheng, Roelof van Zwol, Javad Azimi, Eren Manavoglu, Ruofei Zhang, Yang Zhou, and Vidhya Navalpakkam. Multimedia features for click prediction of new ads in display advertising. In *Proceedings of the 18th ACM SIGKDD International Conference on Knowledge Discovery and Data Mining*, KDD '12, pp. 777-785, New York, NY, USA, 2012. ACM.
P. Damlen, J. Wakefield, and S. Walker. Gibbs sampling for Bayesian non-conjugate and hierarchical models by using auxiliary variables. *Journal of the Royal Statistical Society: Series B*, 61:331-343, 1999.
Kushal S. Dave and Vasudeva Varma. Learning the click-through rate for rare/new ads from similar ads. In *Proceedings of the 33rd International ACM SIGIR Conference on Research and Development in Information Retrieval*, SIGIR '10, pp. 897-898, New York, NY, USA, 2010. ACM.
Jeffrey Dean and Sanjay Ghemawat. MapReduce: Simplified data processing on large clusters. *Commun. ACM*, 51(1):107-113, Jan. 2008.
Thore Graepel, Joaquin Quinonero Candela, Thomas Borchert, and Ralf Herbrich. Web-scale Bayesian click-through rate prediction for sponsored search advertising in Microsoft's Bing search engine. In *Proceedings of the 27th International Conference on Machine Learning*, 2010.
Aditya Krishna Menon, Krishna-Prasad Chitrapura, Sachin Garg, Deepak Agarwal, and Nagaraj Kota. Response prediction using collaborative filtering with hierarchies and side-information. In *Proceedings of the 17th ACM SIGKDD International Conference on Knowledge Discovery and Data Mining*, KDD '11, pp. 141-149, New York, NY, USA, 2011. ACM.
W. Neiswanger, C. Wang, and E. Xing. Asymptotically exact, embarrassingly parallel MCMC. *In arXiv*:1311.4780, 2013.
A. Niculescu-Mizil and R. Caruana. Obtaining calibrated probabilities from boosting. *Proc. 21st Conference on Uncertainty in Artificial Intelligence*, 2005.
A. Niculescu-Mizil and R. Caruana. Predicting good probabilities with supervised learning. *Proc. 22nd International Conference on Machine Learning*, 2005.
Matthew Richardson, Ewa Dominowska, and Robert Ragno. Predicting clicks: Estimating the click-through rate for new ads. In *Proceedings of the 16th International Conference on World Wide Web*, WWW'07, pp. 521-529, New York, NY, USA, 2007. ACM.
Petr Savicky. Tensor rank-one decomposition of probability tables, 2005.
S.L. Scott, A.W. Blocker, and F.V. Bonassi. Bayes and big data: The consensus Monte Carlo algorithm. In *Bayes* 250, 2013.
P.X.K Song. Monte Carlo Kalman flter and smoothing for multivariate discrete state space models. The *Canadian Journal of Statistics*, 28(4), pp. 1-15, 2000.
Yukihiro Tagami, Shingo Ono, Koji Yamamoto, Koji Tsukamoto, and Akira Tajima. CTR prediction for contextual advertising: Learning-to-rank approach. In *Proceedings of the Seventh International Workshop on Data Mining for Online Advertising*, ADKDD '13, pp. 4:1-4:8, New York, NY, USA, 2013. ACM.

R. Tibshirani. Regression shrinkage and selection via the lasso. *Journal of the Royal Statistical Society. Series B*, pp. 267-288, 1996.
Ilya Trofimov, Anna Kornetova, and Valery Topinskiy Using boosted trees for click-through rate prediction for sponsored search. In *Proceedings of the Sixth International Workshop on Data Mining for Online Advertising and Internet Economy*, ADKDD '12, 2012. ACM.
X. Wang and D.B. Dunson. Parallelizing MCMC via Weierstrass sampler. In *arXiv*:1312.4605v2, 2014.
M. Welling and Y. Teh. Bayesian learning via stochastic gradient Langevin dynamics. In *Proc. 28th International Conference on Machine Learning*, 2011.
M. West. Bayesian dynamic modeling. *Bayesian Theory and Applications*, Chapter 8, Oxford University Press, 2013.
Reynold S. Xin, Daniel Crankshaw, Ankur Dave, Joseph E. Gonzalez, Michael J. Franklin, and Ion Stoica. GraphX: Unifying data-parallel and graph-parallel analytics. *CoRR*, abs/1402.2394, 2014.
Reynold S. Xin, Joseph E. Gonzalez, Michael J. Franklin, and Ion Stoica. Graphx: A resilient distributed graph system on spark. In *Proceedings of the First International Workshop on Graph Data Management Experiences and Systems*, GRADES '13, New York, NY, USA, 2013. ACM.
Matei Zaharia, Mosharaf Chowdhury, Tathagata Das, Ankur Dave, Justin Ma, Murphy McCauley, Michael J. Franklin, Scott Shenker, and Ion Stoica. Resilient distributed datasets: A fault-tolerant abstraction for in-memory cluster computing. In *Proceedings of the 9th USENIX Conference on Networked Systems Design and Implementation*, NSDI'12, Berkeley, CA, USA, 2012. USENIX Association.
T. Zaman, E. Fox, and E. Bradlow. A Bayesian approach for predicting the popularity of tweets. *The Annals of Applied Statistics*, 8(3):1583-1611, 2014.
M. Zhou, H. Yang, G. Sapiro, D. Dunson, and L. Carlin. Dependent hierarchical beta process for image interpolation and denoising. In G. Gordon, D. Dunson, and M. Dudik, editors, *Proceedings of the 14th International Conference on Artificial Intelligence and Statistics* (AISTATS), Fort Lauderdale, FL, 2011. JMLR W&CP, vol. 15.
H. Zou and T. Hastie. Regularization and variable selection via the elastic net. Journal of the *Royal Statistical Society. Series B*, pp. 301-320, 2005.
Brian Dalessandro, et al., Scalable Hands-Free Transfer Learning for Online Advertising, in *Proceedings of the 20th ACM SIGKDD International Conference on Knowledge Discovery and Data Mining*, KDD '14, 2014.
Xinran He, et al. Practical Lessons from Predicting Clicks on Ads at Facebook, *The 8th International Workshop on Data Mining for Online Advertising*, ADKDD'14, 2014, New York, NY, USA.
Kuang-chih Lee, et al., Estimating Conversion Rate in Display Advertising from Past Performance Data, *18th ACM SIGKDD international conference on knowledge discovery and data mining*, pp. 768-776, 2012.
H. Brendan McMahan, et al., Ad Click Prediction: a View from the Trenches, *Proceedings of the 19th ACM SIGKDD international conference on Knowledge discovery and data mining*, 2013.
Richard J. Oentaryo, et al., Predicting Response in Mobile Advertising with Hierarchical Importance-Aware Factorization Machine, *WSDM'14: Proceedings of the 7th ACM International Conference on Web Search and Data Mining*, 2014, New York, pp. 123-132.
Perlich, et al, Machine Learning for Targeted Display Advertising: Transfer Learning in Action (Jun. 2013). NYU Working Paper No. 2451/31829. Available at SSRN: https://ssrn.com/abstract=2221761.
Joseph E. Gonzalez, et al. GraphX: Graph Processing in a Distributed Dataflow Framework, Oct. 6, 2014—OSDI'14 Proceedings of the 11th USENIX conference on Operating Systems Design and Implementation. pp. 599-613. Broomfield, CO.
Jun Yan et al., How much can Behavioral Targeting Help Online Advertising? *WWW 2009 MADRID*, pp. 261-270, 2009.

500

502: In an ad display platform associated with N parties, obtaining a party hierarchy for each of the N parties including a plurality of features of the party 504: Selecting a target ad display event. The target ad display event may include N features, wherein each of the N features correspond to a node in a party hierarchy 506: Obtaining a prior probability of occurrence of he target ad display event 508: Decomposing the prior probability into N marginal probabilities 510: Determining a marginal posterior probability for each of the N target ad display event features based on the corresponding marginal prior probability 512: Save the marginal posterior probabilities in their corresponding node of the party hierarchy 514: When receiving an ad display opportunity to display an ad to a target webpage, obtaining a plurality of candidate ads and determining the posterior probability for each of the plurality of candidate ads 516: Selecting a recommended ad from a plurality of ads based on their respective calculated posterior probability of ad realization

Fig. 5

SYSTEMS AND METHODS FOR ESTABLISHING AND UTILIZING A HIERARCHICAL BAYESIAN FRAMEWORK FOR AD CLICK THROUGH RATE PREDICTION

TECHNICAL FIELD

The present disclosure generally relates to online advertising. Specifically, the present disclosure relates to systems with a dynamic hierarchical Bayesian framework for click through rate prediction and methods for establishing the systems.

BACKGROUND

Display Advertising has been the subject of rigorous research with extremely fast development during the past decade. The area has generated billions of revenue, originated hundreds of scientific papers and patents, saw a broad variety of implementations, yet the accuracy of prediction technologies leaves to desire more. The expected revenue from displaying each ad is a function of both the bid price and the Click-Through-Rate (CTR). Sponsored search advertising, contextual advertising, display advertising, and real-time bidding auctions have all relied heavily on the ability of learned models to predict ad CTR accurately, quickly and reliably. CTR prediction is not only related to revenue of web publishers but also experience of users and payment of advertisers, because this influences ranking, filtering, placement and pricing of ads. Campaign performance directly depends on how well the CTR can be estimated, whereas the performance optimization can be considered as the problem of accurately estimating CTR. If these quantities are over-estimated, bid prices will always be higher than what they should be, the advertiser will waste campaign budget on less valuable impressions; on the other hand, if these quantities are underestimated, the advertiser will miss high-value impressions that may have led to actions and the campaign will under deliver. Thus CTR prediction plays an important role in the multi-faceted advertising business. However, it is a big challenge to set up a flexible complete model frame-work that consistently integrates information from all dimensions, including users, publishers, and advertisers.

Two challenges are particularly important. First, CTR generally ranges from 0.001% to 0.5%, which is highly skewed towards the non-clicked class with very high variance. Predictions of CTR for ads are generally based on machine learning or statistical models trained by using the past click data.

Another cause of the complexity of Display Advertising is the huge event space, whose data hierarchy can be expressed as {Advertiser, Publisher, User}. Prior art predominantly describes separate efforts focused on just Advertiser, or Publisher, or User, because normally an integrated multi-dimensional framework being too large and too complex to handle.

SUMMARY

The present disclosure relates to a computer system configured to establish and utilize a database for online ad realization prediction in an ad display platform associated with N parties, wherein N is a positive integral greater than 1.

According to an aspect of the present disclosure, the computer system is configured obtain a party hierarchy for each of the N parties including a plurality of features of the party; select a target ad display event including N features, each of the N features corresponding to a node in a party hierarchy; obtain a prior probability reflecting an unconditional probability of ad realization occurrence at the target ad display event among all possible ad display events; for each of the N features: determine a marginal prior probability by decomposing components associated with the other N−1 features from the prior probability; determine a marginal posterior probability based on the marginal prior probability; and save the marginal posterior probability in the corresponding node of the party hierarchy.

According to another aspect of the present disclosure, a method for establishing and utilizing a database for online ad realization prediction in an ad display platform associated with N parties, wherein N is a positive integral greater than 1, the method comprises obtaining a party hierarchy for each of the N parties including a plurality of features of the party; selecting a target ad display event including N features, each of the N features corresponding to a node in a party hierarchy; obtaining a prior probability reflecting an unconditional probability of ad realization occurrence at the target ad display event among all possible ad display events; for each of the N features, determining a marginal prior probability by decomposing components associated with the other N−1 features from the prior probability; determining a marginal posterior probability based on the marginal prior probability; and saving the marginal posterior probability in the corresponding node of the party hierarchy.

According to yet another aspect of the present disclosure, a computer-readable, non-transitory storage medium may comprise a set of instructions for establishing and utilizing a database for online ad realization prediction in an ad display platform associated with N parties, wherein N is a positive integral greater than 1, and wherein when executed by a computer processor, the set of instructions directs the processor to perform acts of: obtaining a party hierarchy for each of the N parties including a plurality of features of the party; selecting a target ad display event including N features, each of the N features corresponding to a node in a party hierarchy; obtaining a prior probability reflecting an unconditional probability of ad realization occurrence at the target ad display event among all possible ad display events; for each of the N features: determining a marginal prior probability by decomposing components associated with the other N−1 features from the prior probability; determining a marginal posterior probability based on the marginal prior probability; and saving the marginal posterior probability in the corresponding node of the party hierarchy.

BRIEF DESCRIPTION OF THE DRAWINGS

FIG. 5 is a flowchart illustrating a method for establishing and using a database for predicting ad realization rate.

DETAILED DESCRIPTION

The present disclosure provides systems with a dynamic hierarchical Bayesian framework for click through rate prediction and methods for establishing the system. The systems include hierarchical models with various resolutions for all three dimensions of user, publisher, and advertiser, and use tensor decomposition to construct an effective integrated framework that performs inference across all dimensions. As a result, the systems in the present disclosure encapsulate multiple hierarchies and dimensions into a unified Bayesian framework. The main advantage is that it allows key information to be shared among the different resolutions and levels.

Subject matter will now be described more fully hereinafter with reference to the accompanying drawings, which form a part hereof, and which show, by way of illustration, specific example embodiments.

Figure 1:
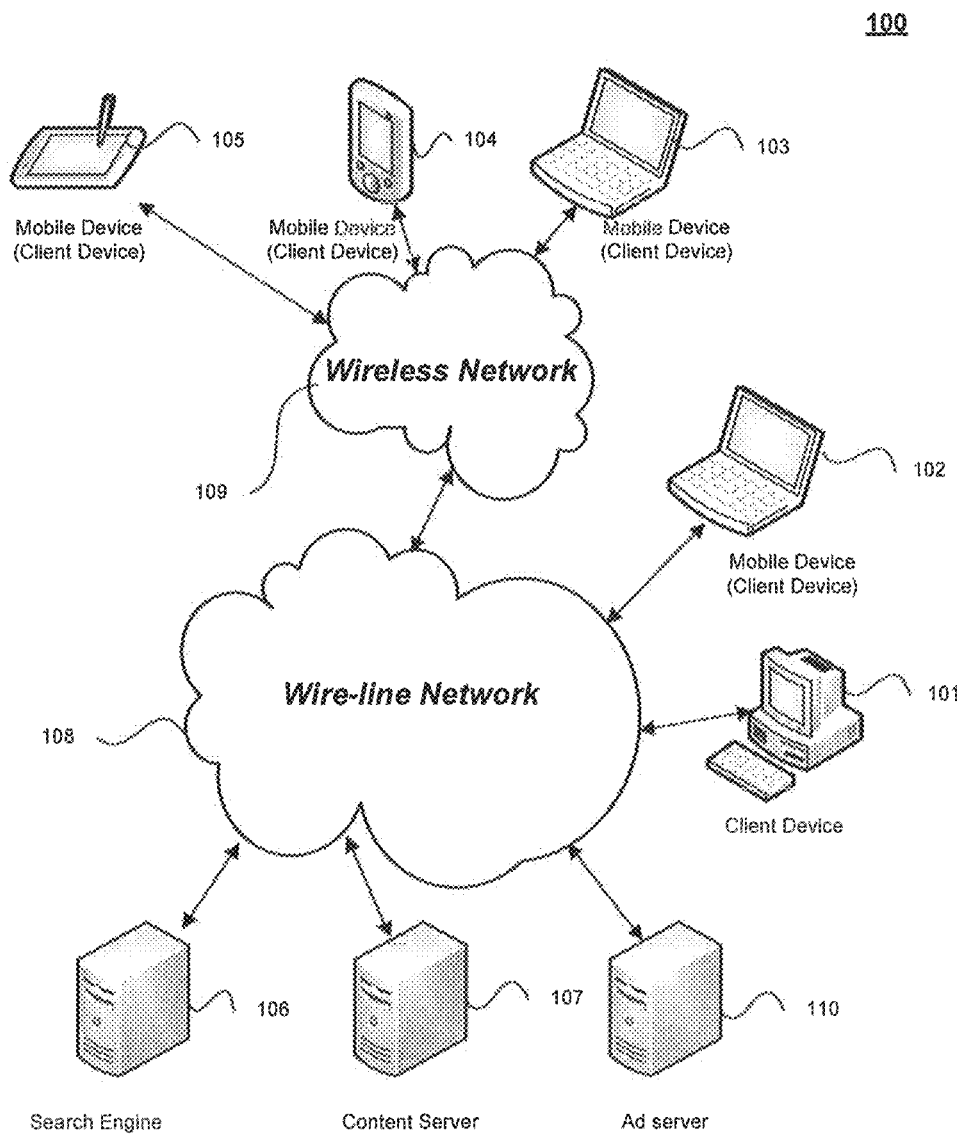
FIG. 1 is a schematic diagram of one embodiment illustrating a network environment in which the systems and methods in the present application may be implemented.

FIG. 1 is a schematic diagram of one embodiment illustrating a network environment in which the systems and methods in the present application may be implemented. Other embodiments of the network environments that may vary, for example, in terms of arrangement or in terms of type of components, are also intended to be included within claimed subject matter. As shown, FIG. 1, for example, a network 100 may include a variety of networks, such as Internet, one or more local area networks (LANs) and/or wide area networks (WANs), wire-line type connections 108, wireless type connections 109, or any combination thereof. The network 100 may couple devices so that communications may be exchanged, such as between servers (e.g., search engine 106, content server 107, and ad server 110 etc.) and client devices (e.g., non-mobile device 101 and mobile device 102-105) or other types of devices, including between wireless devices coupled via a wireless network, for example. A network 100 may also include mass storage, such as network attached storage (NAS), a storage area network (SAN), or other forms of computer or machine readable media, for example.

A network may also include any form of implementation that connects individuals via communications network or via a variety of sub-networks to transmit/share information. For example, the network may include content distribution systems, such as peer-to-peer network, or social network. A peer-to-peer network may be a network employ computing power or bandwidth of network participants for coupling nodes via an ad hoc arrangement or configuration, wherein the nodes serves as both a client device and a server. A social network may be a network of individuals, such as acquaintances, friends, family, colleagues, or co-workers, coupled via a communications network or via a variety of sub-networks. Potentially, additional relationships may subsequently be formed as a result of social interaction via the communications network or sub-networks. A social network may be employed, for example, to identify additional connections for a variety of activities, including, but not limited to, dating, job networking, receiving or providing service referrals, content sharing, creating new associations, maintaining existing associations, identifying potential activity partners, performing or supporting commercial transactions, or the like. A social network also may generate relationships or connections with entities other than a person, such as companies, brands, or so-called 'virtual persons.' An individual's social network may be represented in a variety of forms, such as visually, electronically or functionally. For example, a "social graph" or "socio-gram" may represent an entity in a social network as a node and a relationship as an edge or a link. Overall, any type of network, traditional or modern, that may facilitate information transmitting or advertising is intended to be included in the concept of network in the present application.

Figure 2:
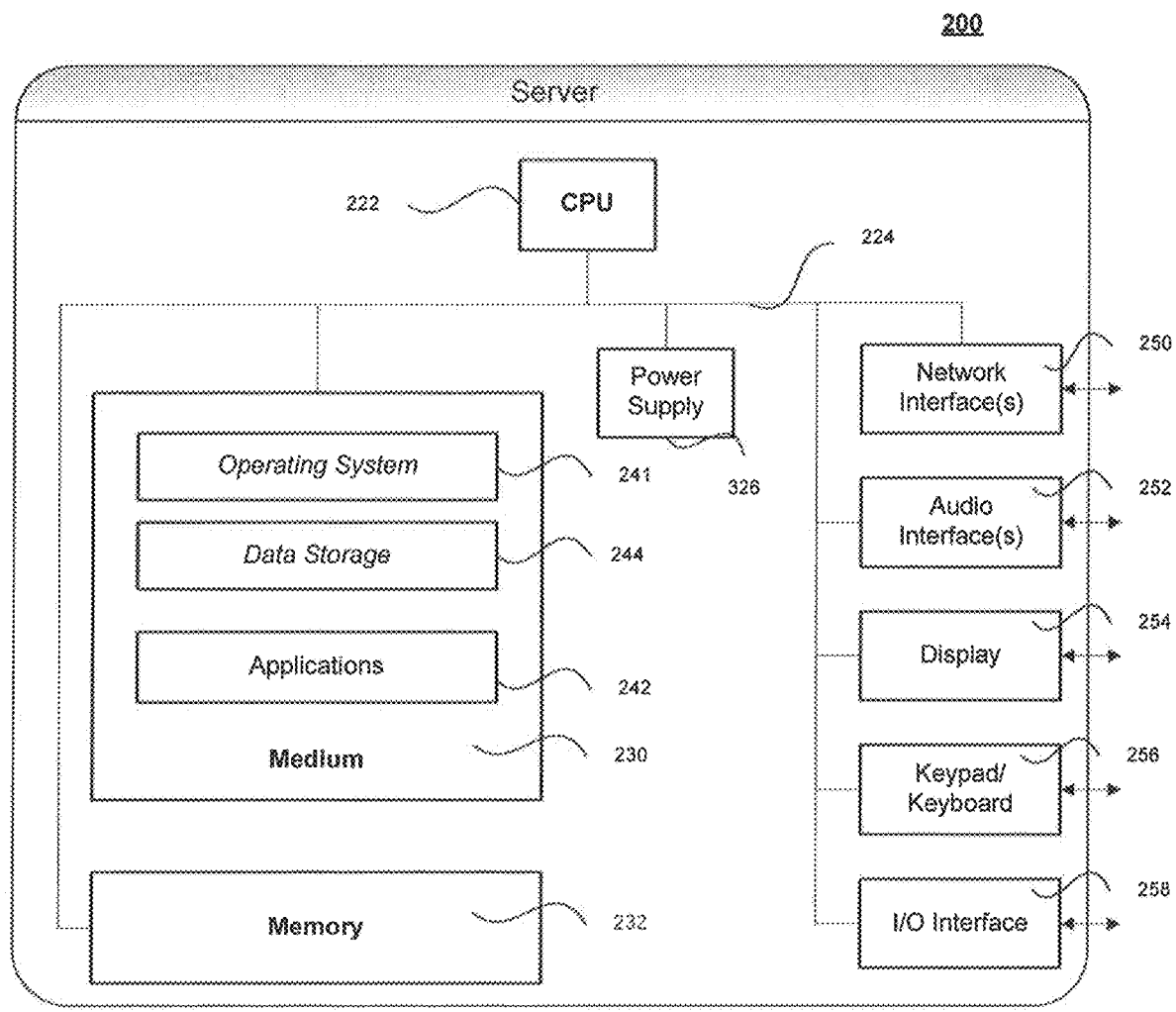
FIG. 2 is a schematic diagram illustrating an example embodiment of a server.

FIG. 2 is a schematic diagram illustrating an example embodiment of a server 200. The server 200 may be used as the search engine 106, the content server 107, and the ad server 110 of FIG. 1. A server 200 may vary widely in configuration or capabilities, but it may include one or more processor 222 (e.g., a CPU) and memory 232, one or more media 230 (such as one or more mass storage devices) storing application programs 242 or data 244, one or more power supplies 226, one or more wired or wireless network interfaces 250, one or more input/output interfaces 258, and/or one or more operating systems 241, such as Windows Server™, Mac OS X™, Unix™, Linux™, FreeBSD™, or the like. Thus a server 200 may include, as examples, dedicated rack-mounted servers, desktop computers, laptop computers, set top boxes, mobile computational devices such as smart phones, integrated devices combining various features, such as two or more features of the foregoing devices, or the like.

The medium 230 and/or the memory 232 may be non-transitory processor-readable storage media. For example, the non-transitory processor-readable storage media may be a RAM memory, flash memory, ROM 334, 340 memory, EPROM memory, EEPROM memory, registers, hard disk, a removable disk, a CD-ROM, or any other form of non-transitory storage medium known in the art. The non-transitory processor-readable storage media may store sets of instructions, or units and/or modules that include the sets of instructions, for conducting operations and/or method steps described in the present disclosure. Alternatively, the units and/or modules may be hardware disposed in the server 200 configured to conduct operations and/or method steps described in the present disclosure. The processor 222 may be configured to execute the sets of instructions and perform the operations in example embodiments of the present disclosure.

The content server 107 illustrated in FIG. 1 may be a server of a website, and the search engine 106 and the ad server 110 may be implemented as content servers or may be in communication with content servers. A content server may include a device that includes a configuration to provide content via a network to another device. A content server may, for example, host a site, such as a social networking site, examples of which may include, but are not limited to, Flicker™, Twitter™, Facebook™, LinkedIn™, or a personal user site (such as a blog, vlog, online dating site, etc.). A content server may also host a variety of other sites, including, but not limited to business sites, educational sites, dictionary sites, encyclopedia sites, wikis, financial sites, government sites, etc. A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as a content server include desktop computers, multiprocessor systems, microprocessor-type or programmable consumer electronics, etc. The content servers may not be under common ownership or control with the ad server or servers.

Merely for illustration, only one processor will be described in client devices and servers that execute operations and/or method steps in the following example embodiments. However, it should be note that the servers in the present disclosure may also include multiple processors, thus operations and/or method steps that are performed by one processor as described in the present disclosure may also be jointly or separately performed by the multiple processors. For example, if in the present disclosure a processor executes both step A and step B, it should be understood that step A and step B may also be performed by two different processors jointly or separately in the client device (e.g., the first processor executes step A and the second processor executes step B, or the first and second processors jointly execute steps A and B).

Figure 3:
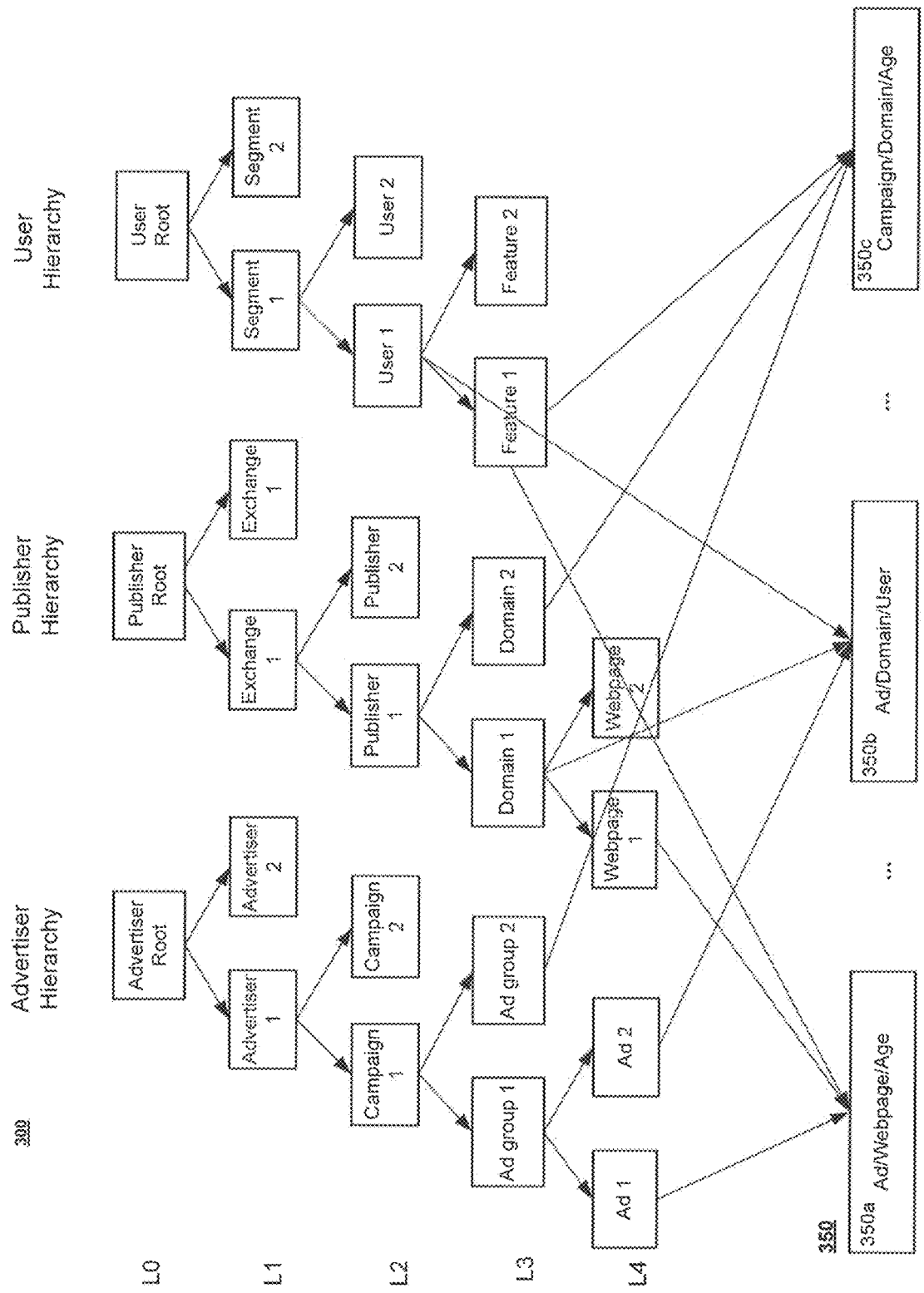
FIG. 3 illustrates a hierarchical multi-dimensional structure of a databases that incorporates advertisers, publishers, and users at the same time in an ad exchange, and how a realization even is associated with information of the advertiser, publisher, and user.

FIG. 3 illustrates a hierarchical multi-dimensional structure of a database 300 that incorporates advertisers, publishers, and users at the same time in an ad exchange, and how a realization even is associated with information of the advertiser, publisher, and user. The database may include information about advertisers, publishers, and users in an advertising platform, such as the ad exchange. The data therein may be collected by the server 200 from a plurality of client devices 101, 102, 103, 104, 105 through the wired and/or wireless network 108, 109. The database 300 may be saved in a local storage medium 230 or a remote storage medium accessible by the server 200 through the network 108, 109.

When an online ad is pushed to a user, the event of ad display is inevitably associated with three parties: a publisher that runs the webpage on which the ad is displayed, an advertiser that provides the ad, and the user that views, clicks, and/or converts the ad. Thus to describe the event, the ad exchange needs at least three dimensions of information: the advertiser, the publisher, and the user. Each dimension includes features that contribute to final realization (e.g., click through, and/or conversion) of the ad. For example, in an ad display instance, a publisher may consider features related to a user (an ad viewer) that viewed an ad to determine which ad is suitable to push to the user. These features, or factors, may include the user's demographic information such as a user's age, gender, race, geographic location, language, education, income, job, and hobbies. The advertiser may consider placing an ad on a publisher's webpage based on features of the publisher. The features, or factors, related to the place where the ad is displayed may include information regarding where on a webpage the ad is displayed (e.g., webpage URL, webpage ID, and/or content category of the webpage, etc.), the domain information (e.g., URL, ID, and/or category of the website containing the webpage), and information and/or category of the publisher that places the ad on the webpage. The user may visit the publisher's websites based on the publisher's features and may realize the ad based on features of the ad. Realization features, or factors, related to the ad may include information of the ad (e.g., ID, content/creative, and/or category of the ad), information of the ad campaign (e.g., ID and/or category of the ad campaign) that the ad belongs to, and/or the information of the advertiser (e.g., ID and/or category of the advertiser) that runs the ad campaign.

The server 200 may collect data 350 of an ad realization event from a plurality of historical online ad display instances. The server 200 analyzes the data 350 to identify factors (hereinafter "realization factors") that have impacts on realization rate (e.g., click through rate, conversion rate, etc.) and/or realization probability (e.g., click through probability, conversion probability, etc.). For example, for an ad and/or similar types of ads, the data 350 may include historical ad display data for the ad and/or similar ads displayed repeatedly in the same webpage, similar webpages, same website (domain), and/or similar websites, and viewed by same user, similar users, and/or users with various demographical features. In an ideal situation, each piece of data in the database may include all the information about the realization factors. But in reality, many pieces of data in the database may only associate with some of the realization factors.

Note that the realization factors in the collected historical data 350 of online ad display instance may have hierarchy relationships. For example, each ad in the campaign platform can be considered as belonging to an advertising campaign, which in its turn belongs to an advertiser. Similarly, Publisher dimension also embeds such hierarchy. Several pages may belong to one publisher and the publisher itself may belong to some category based on its main content. Users can also be segmented hierarchically. For example, a user's feature may include his/her hobby such as sports and arts. These hobbies may be further categorized, so that in an Art category and the Sport category may be further divided into different sub-categories such as golf and fishing. Similarly, in the publisher side, a publisher may run a number of domains (e.g., websites), and each domain may include a plurality of webpages. In the advertiser side, ad Campaign Group1 may include ad Campaign1, which may further include a plurality of ads such as Ad1 and Ad2.

Accordingly, the server 200 may analyze and/or categorize the historical data 350 of online ad display instances based on the hierarchy relationships of the factors. For example, data 350a may be a dataset that includes a realization history for Ad1 when Ad1 was displayed on Webpage1 for users who play golf; data 350b may be a dataset that includes a realization history of Ad2 when Ad2 was displayed in Domain 1 for users whose some hobby information under the Hobby category is known. Data 350c may be a dataset that includes a realization history of ads in Campaign2 when these ads were displayed on Domain2 for users play a sport under the Sport category. Thus an ad realization event E may be expressed as a tuple of three dimensional factors: {Advertiser, Publisher, User}. For example, a realization event may be described as {Ad, Webpage, Age} 350a, or {Ad, Domain, User} 350b, or {Campaign, Domain, Age} 350c.

Based on how fine of a dataset of historical ad display instances can be categorized, the dataset may be described to have a corresponding granularity. A category that can be broken down into smaller sub-categories has a coarser granularity (or larger grained or coarser grained) than its sub-categories (i.e., finer granularity, smaller grained, or finer grained). For example, a webpage may be finer grained than a domain. Accordingly, a dataset, such as dataset 350a, which is associated with finer granularity level are finer grained than a dataset, such as dataset 350c, which is associated with coarser granularity level.

The granularity may affect the precision of expression of an ad display event. For example, an ad display even may be expressed as $$E=\{a(i,j,k,l),p(i,j,k,l),u(i)\},$$

wherein the advertiser dimension $a(i,j,k,l)$ stands for a node in the advertisement hierarchy belonging to the ith advertiser, jth campaign, kth ad group and lth ad. Similarly the publisher dimension p(i,j,k,l) stands for a node belonging to the ith publisher, jth domain, kth subdomain and lth page; and u(i) stands for the ith segment of the user.

Based on data in the database 300, the server 200 may determine a realization rate for each historical ad display events stored therein. When an ad is displayed to a user, whether the user will take an action y of realization depends on the ad displayed, the webpage to display the ad, and who is the user viewing the webpage. Thus the action y may be expressed as a Bernoulli distribution among all ad display events ever occurred. Here, Bernoulli distribution is a probability distribution of a random variable which takes value 1 with success probability and value 0 with failure probability. For a historical ad display event, when the action y occurred, the corresponding value of the Bernoulli function of the ad display event is 1; and when the action y did not occur, the Bernoulli distribution of the corresponding ad display event is 0. Whether the action y occurs may depend on the probability that the ad display event has the right ad, webpage, and user combination. i.e., $$y_{a(i,j,k,l),p(i,j,k,l),u(i)} \sim \text{Bernoulli}(q_{a(i,j,k,l),p(i,j,k,l),u(i)}),$$

where $q=\{q_{a(i,j,k,l),p(i,j,k,l),u(i)}\}$ is the probability table representing the underlying realization probabilities for the tuple of {Advertiser, Publisher, User} and $y_{a(i,j,k,l),p(i,j,k,l),u(i)}$ is the action that has been taken, e.g., click or no-click.

Because the realization rate is based on historical records that have already occurred, it represents a prior probability of ad realization, i.e., an unconditional realization probability that based on statistics. When a publisher sends an ad to a webpage viewed by a user, conceptually the unconditional realization probability of the ad is not a precise measurement of likelihood that the ad will be realized (e.g., clicked or converted) by the user. The actual realization probability is in fact a posterior probability, i.e., a conditional realization probability taking into account that the ad display opportunity involving the particular user, webpage, and ad does occur. In reality, for a prediction system that has sufficient knowledge, when a publisher sends an advertisement to a user, the probability that whether the user will realize the ad can be viewed as an issue of how frequently the realization action y occurs under the tuple {Advertiser, Publisher, User}. Alternatively, the probability can also be viewed as a belief of occurrence base on past knowledge of similar scenarios. In the present disclosure, the server 200 takes the later approach and treats the problem of predicting occurrence of the realization action y as a Bayesian probability.

Thus under a Bayesian analysis, the probability table $q_{a(i,j,k,l),p(i,j,k,l),u(i)}$ is a prior distribution. The server 200 may assign the prior distribution $q_{a(i,j,k,l),p(i,j,k,l),u(i)}$ a beta distribution. Here, the beta distribution is a family of continuous probability distributions defined on the interval [0, 1] parameterized by two positive shape parameters, denoted by $\alpha$ and $\beta$, that appear as exponents of the random variable and control the shape of the distribution. For example, a beta distribution may be in a formula of $$\text{Beta}(q, \alpha, \beta) = \frac{q^{\alpha-1}(1-q)^{\beta-1}}{\int_0^1 u^{\alpha-1}(1-u)^{\beta-1} du}$$

where $q=q_{(a_{i,j,k,l},p_{i,j,k,l},u_i)}$, $\alpha=c_q q_{(a_{i,j,k,l},p_{i,j,k,l},u_i)}$, $\beta=c_q(1-c_q q_{(a_{i,j,k,l},p_{i,j,k,l},u_i)})$, and shape parameters $\alpha$, $\beta>0$.

Each measurement of the advertiser dimension a(i,j,k,l), the publisher dimension p(i,j,k,l), and the user dimension u(i) may be a multi-dimensional tuple corresponding to their respective advertiser, publisher, and user hierarchy databases. Thus the prior distribution (e.g., the above beta distribution) may be a multi-dimensional tensor distribution.

Next, the server 200 may decompose the prior probabilities through tensor decomposition, i.e., find a set of marginal realization probabilities $\{q_{a(i,j,k,l)}, p_{(i,j,k,l)}, q_{u(i)}\}$ that are independent and solely relate to the advertiser, publisher, and user, respectively, so as to express the realization probabilities $q=q_{(a(i,j,k,l),p(i,j,k,l),u(i))}$ in a form of:

$$q_{(a(i,j,k,l),p(i,j,k,l),u(i))} = q_{a(i,j,k,l)} q_{p(i,j,k,l)} q_{u(i)},$$

where $q_{a(i,j,k,l)}$ is the marginal prior realization probability for the Advertiser dimension, and similarly $q_{p(i,j,k,l,t)}$ and $q_{u(i)}$ are marginal prior realization probabilities for the Publisher and User dimensions. As an example, the server 200 may choose rank-one tensor decomposition method for the decomposition.

It should be note that the marginal probabilities $q_{a(i,j,k,l)}$, $q_{p(i,j,k,l,t)}$, and $q_{u(i)}$ may have different granularities. The followings are example models of the prior marginal probabilities $q_{a(i,j,k,l)}$, $q_{p(i,j,k,l,t)}$, and $q_{u(i)}$ in the present disclosure.

For advertisers on an ad exchange, there are usually millions of advertisers and the main difficulty in such simultaneous rate estimation is the paucity of data and absence of events at fine resolution. Hence rate estimates obtained independently for each node of the advertisement hierarchy in FIG. 3 are often unreliable and noisy. When data is hierarchical, borrowing strength from aggregates across multiple resolutions often leads to estimates with a good bias-variance trade-off. The present disclosure may extend the hierarchical Beta priors to perform such borrowing. In general, a "small sample size correction" obtained by properly pooling information across different data aggregates provides better estimates.

The server 200 may choose hyper parameters directly for the hierarchical Beta priors. Alternatively, the server 200 may choose a central point (mean or mode) and some measure of the spread for the prior distribution. For the prior mean, one can consider the average realization rate on different levels and/or granularities that is the long-term frequency of the observed event of interest. The average realization rate may be obtained as an empirical realization rate, such as CTR. Because the prior distribution of $q=q_{(a(i,j,k,l),p(i,j,k,l),u(i))}$ is beta distribution, by definition the mean realization rate of q is $$E(q)=\alpha/(\alpha+\beta).$$

For each level of granularity in the hierarchy database of advertiser, the prior distribution may be:

$$q_{a(i,j,k,l)} \sim \text{Beta}(c_3 q_{a(i,j,k)}, c_3(1-q_{a(i,j,k)})),$$

$$q_{a(i,j,k)} \sim \text{Beta}(c_2 q_{a(i,j)}, c_2(1-q_{a(i,j)})),$$

$$q_{a(i,j)} \sim \text{Beta}(c_1 q_{a(i)}, c_1(1-q_{a(i)})),$$

$$q_{a(i)} \sim \text{Beta}(c_0 q_a, c_0(1-q_a)).$$

The server 200 may estimate the above marginal probabilities of Advertisers at multiple resolutions and/or granularities. Here, $a_{(i)}$ stands for the ith Advertiser, $a_{(i,j)}$ stands for the jth campaign belonging to the ith Advertiser, $a_{(i,j,k)}$ stands for the kth line belonging to the jth campaign and $a_{(i,j,k,l)}$ denotes the lth ads in the hierarchical tree structures, which are determined by existing hierarchies.

Figure 4:
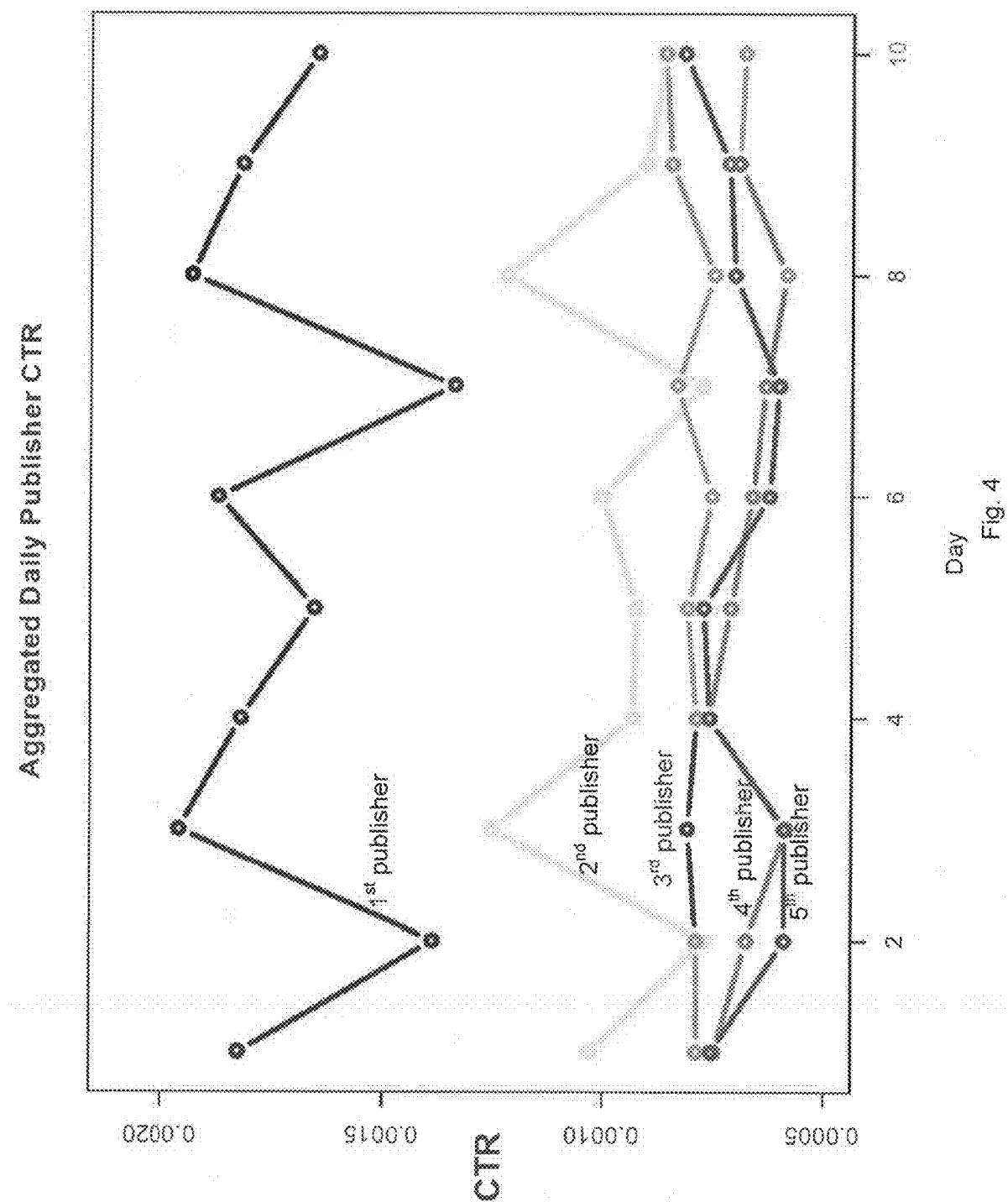
FIG. 4 is a plot showing dynamics of click through rate of publishers varies over time during a period of 10 days.

For publishers on the ad exchange, the publisher dimension $p_{(i,j,k,l,t)}$ usually embeds the most time dependencies. For example, as shown in FIG. 4, the respective click through rate of 5 publishers may vary dramatically over time during a period of 10 days. By acknowledging some kind of data continuity, the server 200 may adopt an exponential smoothing technique to smoothen the underlying realization probabilities and at the end learn a smoothened underlying probability. The server 200 may use the following probit state space formulation to model the latent probabilities smoothened over the past observations. Several reasons support choosing this formulation: 1) All time series models may be rewritten as state space models; 2) It can be extended to multivariate case automatically; 3) It can also characterize many nonstationary or seasonal properties. To simplify the formulation, the server 200 may denote p for the p(i, j, k) cluster in the publisher hierarchy of FIG. 3 and expand the hierarchical structure of this dimension as follows, $$q_{p,t} = \Phi(Z_{p,t}),$$

$$Z_{p,t} = x'_{p,t}\theta_t + \epsilon_t,$$

$$\theta_t = B_t \theta_{t-1} + \zeta_t,$$

$$\epsilon_t \sim N(0, \sigma^2),$$

$$\zeta_t \sim N(0, Q_t),$$

where $\Phi$ is a probit link that transform, $Z_{p,t}$ is the corresponding continuous values after the probit transformation, $x_{p,t}$ is the publisher specific features for cluster p at time t, $\theta_t$ is a state vector, $B_t$ is a known regression vector, $t_t$ is univariate normal with zero mean and $\zeta_t$ is a zero-mean vector representing evolution noise. The sequence $t_t$ and $\zeta_t$ are independent and mutually independent. The state space models may be a hidden Markov models; the state vector $\theta_t$ is a latent or hidden state, often containing values of underlying latent processes as well as time-varying parameters.

For users, incorporating user behavior data can significantly improve the ordering of top results in reality. In the present disclosure, the server 200 may denote $x_{u(i)}$ as the corresponding user features from cluster $u_{(i)}$ and use the following mixture to capture the user variabilities:

$$\text{Logit}(q_{u(i)}) \sim \text{Normal}(x_{u(i)}'\beta_{u(i)}, U_i^2),$$

$$(\beta_{u(i)}, U_i^2) \sim \Sigma_{j=1}^J \pi_j \text{Normal-Inverse-Gamma}(\beta_j^*, U_j^*),$$

where $(\beta_j^*, U_j^*)$ are cluster-specific parameters and $\pi_j$ is the weights for the jth cluster. The above formulation may be rewrite as following:

$$\text{Logit}(q_i) \sim \text{Normal}(x_{u(i)}'\beta_{u(i)}, U_i^2),$$

$$(\beta_{u(i)}, U_i^2)|(Z_i = j) \sim \text{Normal-}IG(\beta_j^*, U_j^*; \beta_0, \Omega_0, \gamma_1, \gamma_2),$$

$$U_j^* \sim IG(\gamma_1, \gamma_2),$$

$$\beta_j^* \sim \text{Normal}(\beta_0, \Omega_0),$$

$$\Omega_0 = \text{Inverse-Wishart}(\gamma_0, I_0),$$

$$Z_i \sim \text{MultiNormial}(\pi), \pi = \{\pi_1, \ldots, \pi_J\},$$

$$\pi \sim \text{Dirichlet}(\theta), \theta = \{\theta_1, \ldots, \theta_J\},$$

where $IG(\gamma_1, \gamma_2)$ stands for inverse gamma distribution with shape and scale parameter $\gamma_1$ and $\gamma_2$, $(\beta_0, \Omega_0)$ are prior mean and covariance for the latent cluster mean $\beta_j^*$, $(\gamma_0, I_0)$ are the degree of freedom and scale matrix for $\Omega_0$, $\theta_S$ are prior parameters for the Dirichlet distributions. In the present disclosure, the server 200 may choose non-informative priors for the above set up, e.g., $\beta_0$ is an 0 vector and $\Omega_0$ is a diagonal matrix with $10^3$ in the diagonals and $\theta_S$ are chosen to be 1. The above models of the user are then place in machine learning by the server 200. After the learning, the server 200 may further segment the users based on the latent marginal realization rate (e.g., CTR or conversion rate) distribution for the user dimension.

After obtaining the models of the marginal prior probabilities of Advertisers, Publishers and Users, the server 200 may determine corresponding marginal posterior probabilities of Advertisers, Publishers and Users under the Bayesian analysis using machine learning technology. These marginal posterior probabilities may correspond with each node of the advertiser hierarchy, publisher hierarchy, and user hierarchy. Accordingly, the server 200 may associate each node in the advertiser hierarchy, publisher hierarchy, and user hierarchy, with the corresponding marginal posterior probabilities to complete establishing and/or updating the publisher hierarchy, advertiser hierarchy, and user hierarchy.

For example, using the marginal prior probability distribution of the advertiser for the advertiser hierarchy the server 200 may determine the marginal posterior probability $f(q_{a(i,j,k,l)}|E)$ of the advertiser and incorporate the marginal posterior probability distribution of the advertiser in the advertiser hierarchy. Accordingly, each node a(i,j,k,l) in the advertiser hierarchy may include a corresponding marginal advertiser realization posterior probability $f(q_{a(i,j,k,l)}|E)$. Similarly, the server may also determine the marginal posterior distribution $f(q_{p(i,j,k,l)}|E)$ and $f(q_{u(i,j,k,l)}|E)$ and incorporate them in their respective database hierarchies. When a user visits a webpage of a publisher, the server 200 may obtain features of the user and publisher, and then match the information with available ads. For each tuple of E={Ad, Publisher, User} the server 200 may be able to search through the advertiser hierarchy, publisher hierarchy, and the user hierarchy and obtain the corresponding marginal priory probabilities $f(q_{a(i,j,k,l)}|E)$, $f(q_{p(i,j,k,l)}|E)$ and $f(q_{u(i,j,k,l)}|E)$. The server 200 then may be able to determine the posterior probability of ad realization (e.g., click through and/or conversion) for an event of E={a(i,j,k,l),p(i,j,k,l),u(i,j,k,l)} by multiplying the marginal posterior probabilities $f(q_{a(i,j,k,l)}|E)$, $f(q_{p(i,j,k,l)}|E)$ and $f(q_{u(i,j,k,l)}|E)$, i.e., $$f(q|E) = f(q_{(a(i,j,k,l),p(i,j,k,l),u(i,j,k,l)}|E) = f(q_{a(i,j,k,l)}|E) \times f(q_{p(i,j,k,l)}|E) \times f(q_{u(i,j,k,l)}|E)$$

Here, the i, j, k, l are general expression of a node in a database hierarchy. The node a(i,j,k,l), p(i,j, k, l) and u(i,j, k, l) are not necessary in the same corresponding position in their hierarchy.

Mathematically, a posterior probability is a probability under a precondition. It is an expectation of occurrence of a target event based on an occurrence of the precondition. The posterior ad realization probability in the present disclosure, such as click through rate, is an expectation of the occurrence of ad realization when certain ad is sent to certain webpage viewed by certain user. Thus the server 200 may treat the posterior probability of ad realization f(q|E) as the predicted realization rate.

According to an example implementation of the present disclosure, assuming that the advertiser hierarchy $a_{i,j}$, has two levels the publisher hierarchy $p_t$ is a function of time, and the user hierarchy $u_i$ has one level, a server may run the following Markov Chain Mote Carlo algorithm to determine and update the marginal posterior probabilities of the publisher, advertiser, and user.

First, the server 200 may update the marginal prior probabilities of the user, publisher, and advertiser. To this end, the server 200 may first conduct Top Level Decomposition Updates. Denote $N_{a_{i,j},p_t}$ as the number of impressions for a specific user, the server 200 may update the marginal prior probability $q_{u_i}$ of a specific User through:

$$\text{Beta}\left(\sum_{i,j,p_t}(y_{a_{i,j},p_t,u_i}) + c_q q_{a_{i,j}} q_{p_t} q_{u_i}, N_{a_{i,j},p_t} - \sum_{i,j,p_t}(y_{a_{i,j},p_t,u_i}) + c_q(1 - q_{a_{i,j}} q_{p_t} q_{u_i})\right).$$

Similarly, denote $N_{a_{i,j},u_i}$ as the number of impressions for a specific publisher, the server 200 may update the marginal prior probability $q_{p_t}$ of a specific Publisher through:

$$\text{Beta}\left(\sum_{i,j,u_i}(y_{a_{i,j},p_t,u_i}) + c_q q_{a_{i,j}} q_{p_t} q_{u_i}, N_{a_{i,j},u_i} - \sum_{i,j,u_i}(y_{a_{i,j},p_t,u_i}) + c_q(1 - q_{a_{i,j}} q_{p_t} q_{u_i})\right).$$

Similarly, denote $N_{p_t,u_i}$ as the number of impressions for a specific advertiser, the server 200 may update the marginal prior probability $q_{a_{i,j}}$ of a specific Advertiser through:

$$\text{Beta}\left(\sum_{p_t,u_i}(y_{a_{i,j},p_t,u_i}) + c_q q_{a_{i,j}} q_{p_t} q_{u_i}, N_{p_t,u_i} - \sum_{p_t,u_i}(y_{a_{i,j},p_t,u_i}) + c_q(1 - q_{a_{i,j}} q_{p_t} q_{u_i})\right).$$

Next, with the updated marginal prior probabilities $q_{u_i}$, $q_{p_t}$, and $q_{a_{i,j}}$, the server may conduct Advertiser Dimension Updates, wherein the server may determine and update the corresponding marginal posterior probability distribution of the Advertiser, User, and Publisher.

Under the Bayesian theorem, posterior probability is proportional to a product of likelihood and prior probability, i.e., Prosterior probability ∝ Likelihood × Prior probability.

Accordingly, the marginal posterior probability $f(q_{a_{i,j}}|E)$ of the Advertiser, or a node in the advertiser hierarchy is proportional to $$f(q_{a_{i,j}}|E) \propto$$

$$\left(\prod_{p_t u_i}\left(\frac{q_{a_{i,j},p_t u_i}}{1 - q_{a_{i,j},p_t u_i}}\right)^{c_q q_{p_t} q_{u_i}}\right)^{q_{a_{i,j}}} \times q_{a_{i,j}}^{c_1 q_{a_i} - 1}(1 - q_{a_{i,j}})^{c_1(1-q_{a_i})-1},$$

wherein $$\left(\prod_{p_t u_i}\left(\frac{q_{a_{i,j},p_t u_i}}{1 - q_{a_{i,j},p_t u_i}}\right)^{c_q q_{p_t} q_{u_i}}\right)^{q_{a_{i,j}}}$$

correspond to the likelihood and $$q_{a_{i,j}}^{c_1 q_{a_i} - 1}(1 - q_{a_{i,j}})^{c_1(1 - q_{a_i})-1}$$

correspond to the prior probability.

The formula of the marginal posterior probability $f(q_{a_{i,j}}|E)$ may not be directly sampled from using a closed form posterior distribution. Accordingly, the server may use the following slice sampling by introducing auxiliary variables $u_a$ and $v_a$, wherein $$u_a \sim \text{unif}(0, q_{a_{i,j}}^{c_1 q_{a_i} - 1}),$$

$$u_a \sim \text{unif}(0, (1 - q_{a_{i,j}})^{c_1(1-q_{a_i})-1}),$$

and then draw $q_{a_{i,j}}$ from the following truncated exponential distribution:

$$\exp\left(\prod_{p_t u_i}\left(\frac{1 - q_{a_{i,j},p_t u_i}}{q_{a_{i,j},p_t u_i}}\right)^{c_q q_{p_t} q_{u_i}}\right) I(q_{a_{i,j}}),$$

where $I(q_{a_{i,j}})$ represents the range derived from $u_a$ and $v_a$.

Similarly, the posterior distribution of $f(q_{a_i}|E)$ of the advertiser, which is one level coarser than $f(q_{a_{i,j}}|E)$ is proportional to $$\prod_j q_{a_{i,j}}^{c_1 q_{a_i} - 1}(1 - q_{a_{i,j}})^{c_1(1-q_{a_i})-1} \times q_{a_i,j}^{c_0 q_0 - 1}(1 - q_{a_i})^{c_0(1-q_0)-1} \propto$$

$$\left(\prod_j\left(\frac{q_{a_{i,j}}}{1 - q_{a_{i,j}}}\right)\right)^{q_{a_i}} \times q_{a_i}^{c_0 q_0 - 1}(1 - q_{a_i})^{c_0(1-q_0)-1},$$

which may be updated through slice sampling as well.

As for the publisher, the posterior distribution $f(q_{p,t}|E)$ of the publisher proportional to $$f(q_{P,t}|E) \propto \left(\prod_{a_{ij} u_i}\left(\frac{q_{a_{i,j},p_t u_i}}{1 - q_{a_{i,j},p_t u_i}}\right)^{c_q q_{p_t} q_{u_i}}\right)^{q_{a_{i,j}}} \exp\left\{-\frac{(q_{p_t} - x'_{p,t}\theta_t)^2}{2\sigma^2}\right\}.$$

The server may use Metropolis-Hastings Method to update $q_{p_t}$ with a proposal distribution $g(q_{p_t}|q^*_{p_t})$=Beta $(c_u q_{p_t}^*, c_u(1-q_{p_t}^*))$, where $q_{p_t}^*$ is the update from the last iteration. The server may determine the new $q_{p_t}$ with the following probability:

$$\frac{f(q_{p_t})g(q^*_{p_t}|q_{p_t})}{f(q^*_{p_t})g(q_{p_t}|q^*_{p_t})}.$$

Assuming that $x_{p,t}$ is the d by 1 feature vector for publisher p at time t, then $$q_{p,t} = \Phi(Z_{p,t}),$$

$$Z_{p,t} = x_{p,t}'\theta_t + \epsilon_t,$$

$$\theta_t = B_t \theta_{t-1} + \zeta_t,$$

$$\epsilon_t \sim N(0, \sigma^2),$$

$$\zeta_t \sim N(0, Q_t).$$

Using Monte Carlo Kalman filter, the filter may update dynamic related parameters. For forward filter prediction step:

$$\theta_{t|t-1} = B_t \theta_{t-1},$$

$$\theta_0 = a_0,$$

$$\Lambda_{t|t-1} = B_t \Lambda_{t-1} B_t' + Q_t,$$

$$\Lambda_0 = Q_0.$$

For forward filter correction step:

$$\theta_t = \theta_{t|t-1} + \Lambda_{t|t-1} X_t \Delta_t^{-1}(Z_t - X_t'\theta_{t|t-1}),$$

$$\Lambda_t = \Lambda_{t|t-1} + \Lambda_{t|t-1} X_t \Delta_t^{-1} X_t' \Lambda_{t|t-1},$$

where $\Delta_t = X_t' \Lambda_{t|t-1} X_t + I$, $X_t = (x_{p,t}')_{p=1,\ldots,P}'$ is a P×d matrix and $Z_t = (Z_{p,t})_{p=1,\ldots,P}'$, $Z_{p,t} = \Phi^{-1}(q_{p,t})$.

And for backward smoothing step, $$\theta_t^* = \theta_t + P_t(\theta_{t+1}^* - B_t \theta_t),$$

$$\Lambda_t^* = \Lambda_t + P_t(\Lambda_{t+1}^* - \Lambda_{t+1|t})P_t',$$

where $P_t = \Lambda_t B_{t+1}' \Lambda_{t+1|t}^{-1}$, $t = n-1, \ldots, 1$. At time n, $\theta_n^* = \theta_n$ and $\Lambda_n^* = \Lambda_n$.

$$\Lambda_t = \Lambda_{t|t-1} + \Lambda_{t|t-1} X_t \Delta_t^{-1} X_t' \Lambda_{t|t-1}.$$

Next, the server may conduct User Dimension Updates. Here, the marginal posterior probability distribution $f(q_{u_i}|E)$ is proportional to $$f(q_{u_i}|E) \propto \prod_{p_t u_i} \left[ \left( \frac{q_{a_i,j p_t u_i}}{1 - q_{a_i,j p_t u_i}} \right)^{c_q q_{a_i,j} q_{p_t}} \right]^{q_{u_i}} \exp\left\{ -\frac{\left(\log\left(\frac{q_{u_i}}{1-q_{u_i}}\right) - x_{u_i}'\beta_{z_i}\right)^2}{2U_{z_i}^2} \right\}.$$

Using the Metropolis-Hastings Method, the server may update $q_{u_i}$ and the proposal distribution is $g(q_{u_i}|q_{u_i}^*) = \text{Beta}(c_u q_{u_i}^*, c_u(1-q_{u_i}^*))$, where $q_{u_i}^*$ is the update from the last iteration. The new $q_{u_i}$ may take the following probability:

$$\frac{f(q_{u_i})g(q_{u_i}^*|q_{u_i})}{f(q_{u_i}^*)g(q_{u_i}|q_{u_i}^*)}.$$

The posterior distribution of $\beta_j^*$ is as following:

$$\prod_{Z_i = j, i=1,\ldots,N} \exp\left\{ -\frac{\left(\log\left(\frac{q_i}{1-q_i}\right) - x_i'\beta_j^*\right)^2}{2U_j^2} \right\} \times \exp\left\{ -\frac{(\beta_j^* - \beta_0)'\Omega_0^{-1}(\beta_j^* - \beta_0)}{2} \right\},$$

and $\beta_j^*$ is updated through multivariate normal with mean:

$$\left( \sum_{Z_i = j, i=1,\ldots,N} \frac{x_i x_i'}{U_j^2} + \Omega_0^{-1} \right)^{-1} \times \left( \sum_{Z_i = j} \frac{x_i \log\left(\frac{q_i}{1-q_i}\right)}{U_j^2} + \Omega_0^{-1}\beta_0 \right)$$

and the covariance matrix:

$$\left( \sum_{Z_i = j, i=1,\ldots,N} \frac{x_i x_i'}{U_j^2} + \Omega_0^{-1} \right)^{-1}$$

The posterior distribution of $U_j$ is proportional to:

$$\prod_{Z_i = j, i=1,\ldots,N} \exp\left\{ -\frac{\left(\log\left(\frac{q_i}{1-q_i}\right) - x_i'\beta_j^*\right)^2}{2U_j^2} \right\} \times U_j^{2(\alpha+1)} \exp\left\{ -\frac{\gamma}{U_j^2} \right\},$$

$U_j^2$ may be updated through $$U_j^2 \sim IG\left( \alpha + \frac{\sum I(Z_i == j)}{2}, \gamma + \frac{1}{2} \sum_{Z_i = j} \left( \log\left(\frac{q_i}{1-q_i}\right) - x_i'\beta_j^* \right)^2 \right),$$

and $Z_i$ may be updated through the multinomial distribution with $\pi_j^*$ with the constraint that $\Sigma_{j=1}^J \pi_j^* = 1$, wherein $$\pi_j^* \propto \pi_j \log \text{normal}(q_i; x_i'; \beta_j^*; U_j^2).$$

$\pi_j$ is updated through $$\pi \sim \text{Dirichlet}\left( \sum_{i=1}^N I(Z_i == j) + \theta_j \right).$$

Based on the above discussion, the proposed algorithm is summarized in Algorithm 1.

| Algorithm 1 Batch Markov Chain Monte Carlo (MCMC) Algorithm |
|---|
| Require: $y_{a_{i,j}p_t u_i}$, $x_{p,t}$, $x_u$, $c_q$, $c_{0:1}$, $q_a$, $B_t$, $\sigma^2$, $Q_t$, $\gamma_0$, and $\theta$ |
| Ensure: the initial value for $q_{a_{i,j}}$, $q_{p_t}$, $q_{u_i}$, $\theta_0$, Z, $\beta_0$, and $\Omega_0$ |
| 1:    for i = 1 to Total number of iterations do |
| 2:      for $a_{i,j}$ do |
| 3:        for $p_t$ do |
| 4:          for $u_i$ do |
| 5:            Update $q_{a_{i,j}p_t u_i}$ through Beta distributions described in the Top Level Decomposition Updates; |
| 6:            Update $q_{a_{i,j}}$ and $q_{a_i}$ through truncated exponential distributions as in the Advertiser Dimension Updates; |
| 7:            Draw $q_{p,t}$ and related parameters through the forward filtering backward sampling algorithm in the Publisher Dimension Updates; |
| 8.            Update related parameters for user variabilities through the mixture distributions in the Publisher Dimension Updates and User Dimension Updates. |
| 9:          end for |
| 10:        end for |
| 11:      end for |
| 12:    end for |

FIG. 5 is a flowchart illustrating a method for establishing and using a database for predicting ad realization rate in conjunction with the system introduced above. The method may be implemented in a non-transitory storage medium of the server 200 as a set of instructions and may be executed by the processor of the server 200.

Starting from step 502, in an ad display platform associated with N parties, the server may obtain a party hierarchy for each of the N parties including a plurality of features of the party.

For example, the N parties may be a user, a publisher operating a website associated with the ad display platform, and an advertiser providing ads to webpages through the ad display platform. The server 200 may obtain a plurality of historical ad display events occurs in an ad exchange and using the ad display events to establish a database including advertiser hierarchy, publisher hierarchy, and user hierarchy, such as those shown in FIG. 3. The user hierarchy including features of users in the ad exchange, the publisher hierarchy may include features of the publishers in the ad exchange, and the advertiser hierarchy may include features of an ads provided by the advertisers.

In step 504, the sever may select a target ad display event. The target ad display event may include N features, wherein each of the N features correspond to a node in a party hierarchy.

For example, the target ad display event may be an instant when a user is browsing a webpage run by a publisher, and an ad is qualified to be sent and present to the user. Thus the N features of the target ad display event may include a feature of the user browsing a webpage of the website, a feature of the publisher, and a feature of the advertiser providing an ad to the webpage.

In step 506, the server may obtain a prior probability reflecting an probability of ad realization occurrence at the target ad display event among all possible ad display events. This posterior probability may be free from any pre-condition. For example, the posterior probability may be simply a CTR collected from statistical information of historical ad display event.

In step 508, the server may decompose the prior probability into N marginal probabilities. Each marginal prior probability corresponds with one of the N features of the target ad display event and does not include component of other features of the target ad display event.

For example, for the target ad display event that includes features of the publisher, the advertiser, and the user, the server may decompose the prior probability into marginal prior probability of the publisher that includes component of the publisher only, marginal prior probability of the advertiser that includes component of the advertiser only, and marginal prior probability of the user that includes components of the user only. Further, the marginal prior probability may be decomposed via methods such as the rank-one tensor decomposition method, so that the prior probability equals a tensor products of the marginal prior probabilities.

In step 510, the server may determine a marginal posterior probability for each of the N target ad display event features based on the corresponding marginal prior probability. For example, the server may calculate the marginal posterior probability of the publisher using the method of Publishers Dimension Updates as introduced above. Similarly, the server may calculate the marginal posterior probabilities of the advertiser and user using the methods of Advertiser Dimension Updates and User Dimension Updates as introduced above.

As a result, a product of the publisher marginal posterior probability, advertiser marginal posterior probability, and user marginal posterior probability equals to the posterior probability of the target ad display event. Here, the posterior probability of the target ad display event reflects probability that the user will realize (e.g., click through or convert) the ad when the publisher does display the ad in the webpage that the user is browsing, thus is a conditional probability In step 512, the server may save the marginal posterior probabilities in their corresponding node of the party hierarchy. For example, the server may save the publisher marginal posterior probability in the publisher hierarchy node that includes the feature of the publisher in the target ad display event.

With the updated database hierarchy, a posterior probability of an ad display event may become easy to calculate, thereby making selecting an ad for an online ad display opportunity easier. In step 514, the server obtain a plurality candidate ads for the online ad display opportunity and determines posterior probability for each of the plurality of candidate ads. And then in step 516, the server select a recommended ad from the plurality of candidate ads based on their respective calculated posterior probability of ad realization.

When a server receives an ad display opportunity to display an ad to a target webpage, the server may first obtain a plurality of candidate ads that is qualified for the opportunity, and then select the recommended ad therefrom based on probabilities of realization (e.g., click through or conversion) of the plurality of candidate ads.

To this end, for each of the plurality of candidate ads, the server may obtain a feature of a user viewing the webpage, a feature of the ad, and a feature of a publisher running the webpage. The server then may obtain from the user hierarchy the marginal posterior probability associated with the feature of the user; obtain from the advertiser hierarchy the marginal posterior probability associated with the feature of the ad; and obtain from the publisher hierarchy the marginal posterior probability associated with the feature of the publisher. Finally, the server may determine the posterior probability that the user will realize the ad, if the ad is sent to the user, by multiplying the three marginal posterior probabilities together.

After determining the posterior probability for each of the plurality of candidate ads, the server may select a predetermined number of candidate ads that have the highest posterior probability values and send these selected ads as recommended ads to the advertiser. Alternatively, the server may apply other display rules preset by the advertiser and select, from the predetermined number of candidate ads, one recommended ad to display on the webpage for the user to view. For example, in a simpler scenario the advertiser preset to the publisher that the ad that has the highest likelihood to be clicked through by a user should be selected. Accordingly, when a user opens a webpage run by the publisher, the server may select from the plurality of candidate ads one with the highest posterior probability as the recommended ad, and send the recommended ad to the user. The recommend ad has the highest posterior probability value, thus is an ad that is most likely to be clicked by the user.

The above systems and methods for establishing and utilizing a hierarchical Bayesian framework for ad click through rate prediction provide a much better prediction results for ad click through rate. In an implementation, an ad campaign with a life cycle spanning from Jan. 19, 2015 till Mar. 31, 2015 was conducted and the data of one running is collected up to date. This campaign has multiple lines with each line consisting of several ads. Each line has its specific targeting criteria with allocated budgets. The campaign itself has a setup cost-per-click (CPC) goal and is bidding with a dynamical click-per-impression (CPM) pricing type. If a CPC goal is set up, then the optimal bid price can be determined from the expected cost-per-impression, which is equal to the CTR for this impression multiplied by the CPC goal. On average, the dataset contains 8 million instances daily with 134 selected features from the different resolutions for Advertisers, Publishers and Users.

The campaigns were run on YAM+, which is a DSP (Demand Side Platform) alike. YAM+ provides the capabilities to do the real-time bidding for the advertiser on both Yahoo! and 3rd party inventory. The platform's goal is to maximize its campaigns performance. It is roughly 100 ms before a time-out for DSP to decide which campaign to bid and how much to bid for an incoming ad call. And the predictive models need to be executed multiple times before this time-out threshold. Furthermore, in this environment, there are significant variances on daily actively running campaigns as well as supplied inventories. So, it requires the model to be able to run very fast and also automatically adapt to the external changes by itself.

The popular regularized Generalized linear model using Lasso model and Elastic Net model were tested on the 3 dimensions independently with and without calibration on the MapReduce system. The methods in the present disclosure were tested and the following algorithms in this campaign scenario were run:

1. Regularized Generalized Linear Model using Lasso and Elastic Net without calibration;
2. Regularized Generalized Linear Model using Lasso and Elastic Net with calibration through isotonic regression]; and
3. The methods of the present disclosure without calibration.

The sensitivity of the performances of algorithm 1 to 3 were also tested on different number of mappers, ranging from 80 to 10000. It is observed that when the number of mappers increase, the related accuracies decrease. In general, Lasso achieves the worst performances and Elastic Net achieve better performances compared to Lasso, where Elastic Net is a better choice when features are correlated. The reason is that 134 features selected from the different resolutions of the different hierarchies are somewhat correlated with each other. The methods in the present disclosure are ranked the best over the three algorithms.

While example embodiments of the present disclosure relate to systems and methods for establishing and utilizing a database for online ad realization prediction in an ad display platform, the systems and methods may also be applied to other Applications. For example, in addition to online advertising, the methods and apparatus may also be applied to an online store to push service or product information to a customer. The present disclosure intends to cover the broadest scope of systems and methods for hierarchy construction and utilization without pre-empting others from applying the mathematical equations of calculating used in the present disclosure.

Thus, example embodiments illustrated in FIG. 1-5 serve only as examples to illustrate several ways of implementation of the present disclosure. They should not be construed as to limit the spirit and scope of the example embodiments of the present disclosure. It should be noted that those skilled in the art may still make various modifications or variations without departing from the spirit and scope of the example embodiments. Such modifications and variations shall fall within the protection scope of the example embodiments, as defined in attached claims.

The invention claimed is:

1. A computer system, comprising:
a storage medium including a set of instructions for establishing and utilizing a database for online ad realization prediction in an ad display platform associated with N parties, wherein N is a positive integral greater than 1; and
a processor in communication with the storage medium, wherein when executing the set of instructions, the processor is directed to:
obtain a party hierarchy for each of the N parties including a plurality of features of at least one party;
select a target ad display event including N features, each of the N features corresponding to a node in at least one party hierarchy;
obtain a prior probability reflecting an unconditional probability of ad realization occurrence at the target ad display event among all possible ad display events;
for each of the N features:
determine a marginal prior probability by decomposing components associated with remaining N-1 features from the prior probability;
determine a marginal posterior probability based on the marginal prior probability; and
save the marginal posterior probability in a corresponding node of the party hierarchy;
select one or more online ads for one or more online ad display opportunities based upon one or more party hierarchies associated with one or more of the N parties; and
transmit the one or more online ads to one or more remote devices.

2. The computer system of claim 1, wherein the saving the marginal posterior probability in the corresponding node of the party hierarchy generates an updated database hierarchy.

3. The computer system of claim 2, wherein the generation of the updated database hierarchy increases an ease of calculating at least one posterior probability.

4. The computer system of claim 2, wherein the generation of the updated database hierarchy increases an ease with which the one or more online ads are selected for the one or more online ad display opportunities.

5. The computer system of claim 1, wherein the N parties comprises a user, a publisher operating a website associated with the ad display platform, and an advertiser providing ads to webpages through the ad display platform;
the one or more party hierarchies comprises a user hierarchy including a feature of the user, a publisher hierarchy including a feature of the publisher, and an advertiser hierarchy including a feature of an ad provided by the advertiser; and
the N features of the target ad display event comprise a second feature of the user browsing a webpage of the website, a second feature of the publisher, and a second feature of the advertiser providing an ad to the webpage.

6. The computer system of claim 2, wherein prior to the generation of the updated database hierarchy, obtaining first rate estimates associated with one or more ads is associated with a first level of difficulty and a first level of reliability, and after the generation of the updated database hierarchy, obtaining second rate estimates associated with one or more ads is associated with a second level of difficulty and a second level of reliability, wherein the first level of difficulty is greater than the second level of difficulty and the second level of reliability is greater than the first level of reliability.

7. The computer system of claim 2, wherein the generation of the updated database hierarchy enables borrowing strength from aggregates across multiple resolutions of data.

8. A method for establishing and utilizing a database for online ad realization prediction in an ad display platform associated with N parties, wherein N is a positive integral greater than 1, the method comprising:
obtaining a party hierarchy for each of the N parties including a plurality of features of at least one party;
selecting a target ad display event including N features, each of the N features corresponding to a node in at least one party hierarchy;
obtaining a prior probability reflecting an unconditional probability of ad realization occurrence at the target ad display event among all possible ad display events;
for each of the N features:
determining a marginal prior probability by decomposing components associated with remaining N−1 features from the prior probability;
determining a marginal posterior probability based on the marginal prior probability; and
saving the marginal posterior probability in a corresponding node of the party hierarchy;
selecting one or more online ads for one or more online ad display opportunities based upon one or more party hierarchies associated with one or more of the N parties; and
transmitting the one or more online ads to one or more remote devices.

9. The method of claim 8, wherein a product of N marginal prior probabilities equals the prior probability.

10. The method of claim 8, wherein the prior probability is decomposed using a rank-one tensor decomposition method.

11. The method of claim 8, wherein the saving the marginal posterior probability in the corresponding node of the party hierarchy generates an updated database hierarchy, wherein prior to the generation of the updated database hierarchy, obtaining first rate estimates associated with one or more ads is associated with a first level of difficulty and a first level of reliability, and after the generation of the updated database hierarchy, obtaining second rate estimates associated with one or more ads is associated with a second level of difficulty and a second level of reliability, wherein the first level of difficulty is greater than the second level of difficulty and the second level of reliability is greater than the first level of reliability.

12. The method of claim 8, wherein the N parties comprises a user, a publisher operating a website associated with the ad display platform, and an advertiser providing ads to webpages through the ad display platform;
the one or more party hierarchies comprise a user hierarchy including a feature of the user, a publisher hierarchy including a feature of the publisher, and an advertiser hierarchy including a feature of an ad provided by the advertiser; and
the N features of the target ad display event comprise a second feature of the user browsing a webpage of the website, a second feature of the publisher, and a second feature of the advertiser providing an ad to the webpage.

13. The method of claim 12, wherein the advertiser hierarchy, the publisher hierarchy, and the user hierarchy are established based on historical ad display events.

14. The method of claim 12, further comprising:
receiving an online ad display opportunity to display an ad to a target webpage;
obtaining a plurality of candidate ads qualified for the online ad display opportunity;
for each of the plurality of candidate ads:
obtaining a third feature of a user viewing the webpage;
obtaining a third feature of the ad;
obtaining a third feature of a publisher running the webpage;
obtaining, by a computer from the user hierarchy, the marginal posterior probability associated with the feature of the user;
obtaining, by a computer from the advertiser hierarchy, the marginal posterior probability associated with the feature of the ad;
obtaining, by a computer from the publisher hierarchy, the marginal posterior probability associated with the feature of the publisher; and
determining a posterior probability that the user will realize the ad based on a product of the marginal posterior probability associated with the feature of the user, the marginal posterior probability associated with the feature of the ad, and the marginal posterior probability associated with the feature of the publisher;
selecting a second ad from the plurality of candidate ads based on their respective posterior probabilities as a recommended ad; and
display the second ad to fulfill the online ad display opportunity.

15. A computer-readable non-transitory storage medium, comprising a set of instructions for establishing and utilizing a database for online ad realization prediction in an ad display platform associated with N parties, wherein N is a positive integral greater than 1, and wherein when executed by a processor, the set of instructions directs the processor to perform acts of:
obtaining a party hierarchy for each of the N parties including a plurality of features of at least one party;
selecting a target ad display event including N features, each of the N features corresponding to a node in at least one party hierarchy;
obtaining a prior probability reflecting an unconditional probability of ad realization occurrence at the target ad display event among all possible ad display events;
for each of the N features:
determining a marginal prior probability by decomposing components associated with other N−1 features from the prior probability;
determining a marginal posterior probability based on the marginal prior probability; and
saving the marginal posterior probability in a corresponding node of the party hierarchy;
selecting one or more online ads for one or more online ad display opportunities based upon one or more party hierarchies associated with one or more of the N parties; and
transmitting the one or more online ads to one or more remote devices.

16. The computer-readable non-transitory storage medium of claim 15, wherein a product of N marginal prior probabilities equals the prior probability.

17. The computer-readable non-transitory storage medium of claim 15, wherein the saving the marginal posterior probability in the corresponding node of the party hierarchy generates an updated database hierarchy.

18. The computer-readable non-transitory storage medium of claim 15, wherein the N parties comprises a user, a publisher operating a website associated with the ad display platform, and an advertiser providing ads to webpages through the ad display platform;

the one or more party hierarchies comprise a user hierarchy including a feature of the user, a publisher hierarchy including a feature of the publisher, and an advertiser hierarchy including a feature of an ad provided by the advertiser; and the N features of the target ad display event comprise a second feature of the user browsing a webpage of the website, a second feature of the publisher, and a second feature of the advertiser providing an ad to the webpage.

19. The computer-readable non-transitory storage medium of claim 18, wherein the advertiser hierarchy, the publisher hierarchy, and the user hierarchy are established based on historical ad display events.

20. The computer-readable non-transitory storage medium of claim 17, wherein prior to the generation of the updated database hierarchy, obtaining first rate estimates associated with one or more ads is associated with a first level of difficulty and a first level of reliability, and after the generation of the updated database hierarchy, obtaining second rate estimates associated with one or more ads is associated with a second level of difficulty and a second level of reliability, wherein the first level of difficulty is greater than the second level of difficulty and the second level of reliability is greater than the first level of reliability.

* * * * *